United States Patent [19]

Beardmore et al.

[11] Patent Number: 5,673,666
[45] Date of Patent: Oct. 7, 1997

[54] CONNECTING ROD FOR INTERNAL COMBUSTION ENGINE

[75] Inventors: John Meade Beardmore, Howell; Bruce Alan Tucker, Brighton, both of Mich.

[73] Assignee: General Motors Corporation, Detroit, Mich.

[21] Appl. No.: 544,078

[22] Filed: Oct. 17, 1995

[51] Int. Cl.⁶ .................................................. G05G 1/00
[52] U.S. Cl. ........................... 123/197.3; 123/579 E
[58] Field of Search ........................... 123/197.3, 197.4; 74/579 R, 581, 579 E

[56] References Cited

U.S. PATENT DOCUMENTS

| | | | |
|---|---|---|---|
| 1,385,758 | 7/1921 | Schultz | 123/78 E |
| 1,389,055 | 8/1921 | Kugler | 74/582 |
| 1,766,024 | 6/1930 | Jones | 74/581 |
| 1,903,064 | 3/1933 | Onstott | 74/588 |
| 4,391,161 | 7/1983 | Ban et al. | 74/579 E |
| 4,425,820 | 1/1984 | Swozil | 74/579 E |
| 4,546,669 | 10/1985 | Fischer et al. | 74/579 E |
| 4,691,590 | 9/1987 | Geringer et al. | 74/581 |
| 4,805,483 | 2/1989 | Beckmann et al. | 74/579 E |
| 4,827,795 | 5/1989 | Machida et al. | 123/197.3 |
| 4,841,801 | 6/1989 | Tice | 123/197.3 |
| 4,905,540 | 3/1990 | Hughes et al. | 123/197.3 |
| 5,140,869 | 8/1992 | Mrdjenovich et al. | 74/579 E |
| 5,154,098 | 10/1992 | Maumus | 74/579 E |
| 5,193,413 | 3/1993 | Kizler et al. | 123/197.3 |
| 5,370,093 | 12/1994 | Hayes | 74/579 E |

Primary Examiner—David A. Okonsky
Attorney, Agent, or Firm—Karl F. Barr, Jr.

[57] ABSTRACT

According to the present invention a connecting rod constructed of a rigid, primary material is defined by a longitudinally extending beam having, at a first end, a piston pin bearing boss and, at a second end, a crankpin bearing boss. The longitudinally extending beam includes an opening extending from a location near the piston pin bearing boss to a location near the crankpin bearing boss to define opposing webs or legs. A secondary material having stiffness properties different from said primary material is disposed within the opening in the longitudinally extending beam. Under loads imposed on the connecting rod during the combustion event, the opposing legs exhibit a resiliency which allows inward movement, towards the beam axis thereby compressing the secondary material in the opening. The inward movement of the opposing legs, and resulting compression of the secondary material therebetween, absorbs a portion of the applied load to reduce or modify the amplitude of the force transferred to the crankpin. As the force of the combustion event diminishes through downward movement of the piston in the engine cylinder, the opposing legs move outwardly, away from the beam axis, returning to their original relationship and relieving the compressive forces imposed on the secondary material in the opening. As the webs return to the starting position, a substantial portion of the previously absorbed load, applied to the connecting rod by the combustion event, is transferred to the crankpin such that the total transmitted force is substantially the same as that of a typical connecting rod while the peak force amplitude is reduced.

5 Claims, 3 Drawing Sheets

CONNECTING ROD FOR INTERNAL COMBUSTION ENGINE

TECHNICAL FIELD

The present invention is directed to a connecting rod for internal combustion engines and, in particular, to a compliant connecting rod configured to reduce peak force amplitude.

BACKGROUND

Engine noise generated by the combustion process may be increased by engine technologies directed at improved combustion efficiency. Aggressive burn rates, for instance, may impart forces on the engine structure which limit the effectiveness of typical noise control measures. Historically, robust cylinder case structures and stiff crankshafts have been generally effective in controlling and reducing combustion dominant noise. While crankcase structural integrity is important in the design of high performance internal combustion engines, additional solutions are required to achieve acceptable noise and sound quality.

SUMMARY

Noise control measures typically involve attention to the source of generated noise, the path of the noise, and, the noise receiver or radiator. With the premise that it is undesirable to alter the source, in this instance the combustion process, the present invention focuses on the reduction, by absorption, of combustion energy in the piston/connecting rod path. A degree of compliance is introduced into the path which thereby effects a change in mechanical impedance along the path from the combustion chamber to the crankshaft. The connecting rod of the present invention modifies the sharp transient force input to these components thereby spreading the energy over a greater time period through a reduction in stiffness along the noise transmission path. By modifying the path of noise in the piston/connecting rod assembly, high frequency generated noise is reduced.

According to the present invention a connecting rod is defined by a longitudinally extending beam having, at a first end, a piston pin bearing boss and, at a second end, a crankpin bearing boss. The longitudinally extending beam includes an opening extending from a location near the piston pin bearing boss to a location near the crankpin bearing boss to thereby define opposing webs or legs. Within the opening between the webs is disposed a material of secondary flexibility, differing from that of the webs, which is selected to have predetermined flexibility and stiffness characteristics. Under loads imposed on the connecting rod during the combustion event, the opposing legs exhibit a resiliency which allows inward movement, towards the beam axis. The inward movement of the opposing webs, compresses the secondary material disposed therebetween such that the flexation of the legs and the compression of the secondary material disposed between the legs absorbs, and stores, a portion of the applied load, thereby reducing the amplitude of the force transferred to the crankpin. As the force of the combustion event diminishes through downward movement of the piston in the engine cylinder, the opposing legs move outwardly, away from the beam axis, returning to their original relationship. As the webs return to the starting position, a portion of the previously stored load is returned to the crankpin, such that the total transmitted force is substantially the same as that of a typical connecting rod while the peak force amplitude is modified. Location of a secondary material within the opening in the connecting rod allows the designer to achieve other characteristics such as force damping or non-linear stiffness resulting in non-linear load-deflection characteristics.

The connecting rod of the present invention may include means for limiting the total flexation of the opposing beam legs by varying the cross section of the beam opening defining the legs. Through a reduction in the beam opening cross section, inward movement is positively limited the inner surfaces of the legs which define the walls of the beam opening.

These and other features, objects and advantages of the invention will be more apparent from the following detailed description and drawings.

DESCRIPTION OF THE PREFERRED EMBODIMENTS

Figure 1:
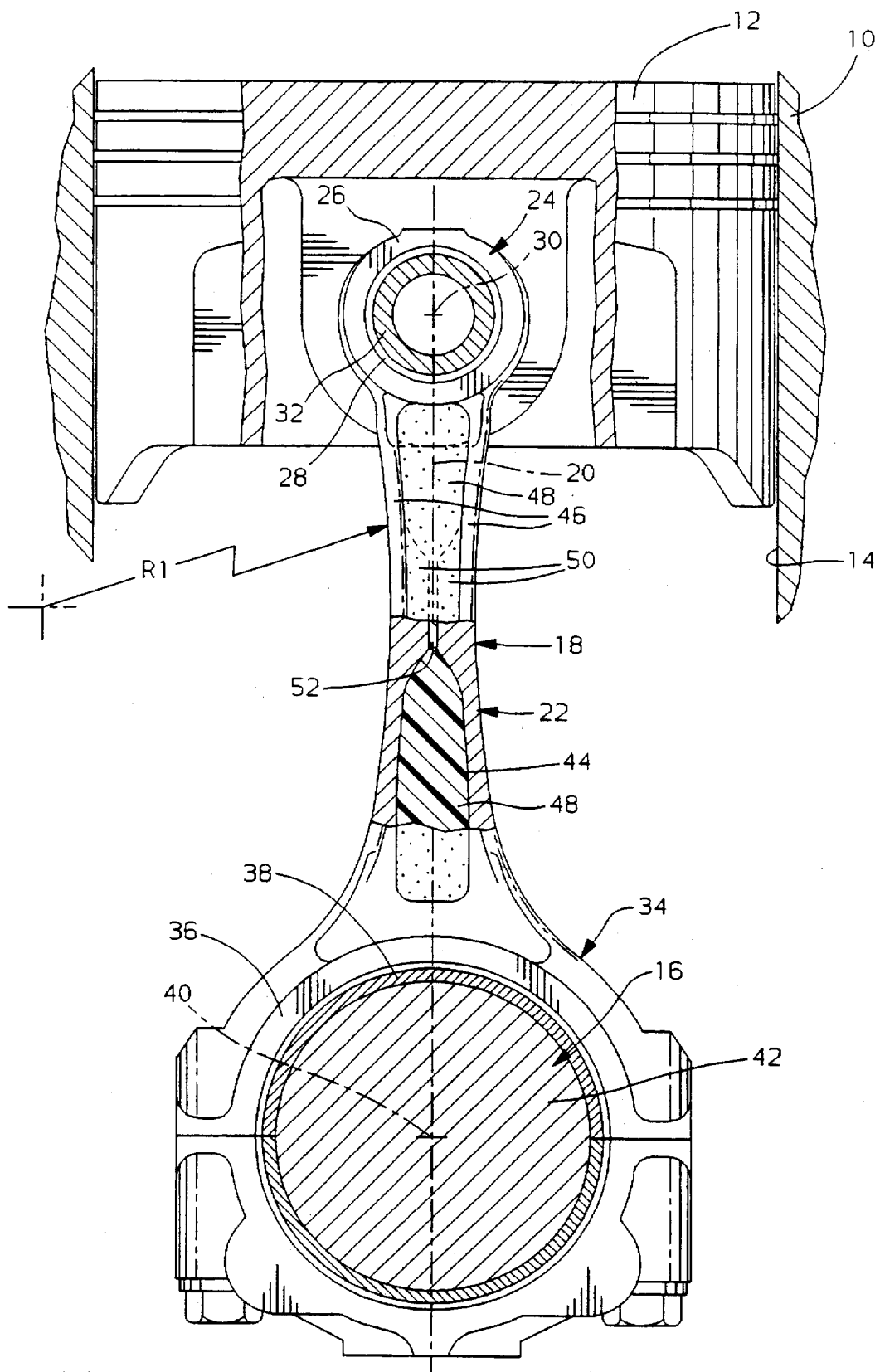
FIG. 1 is a partial, schematic view of an internal combustion engine which includes a connecting rod embodying features of the present invention.
Figure 2:
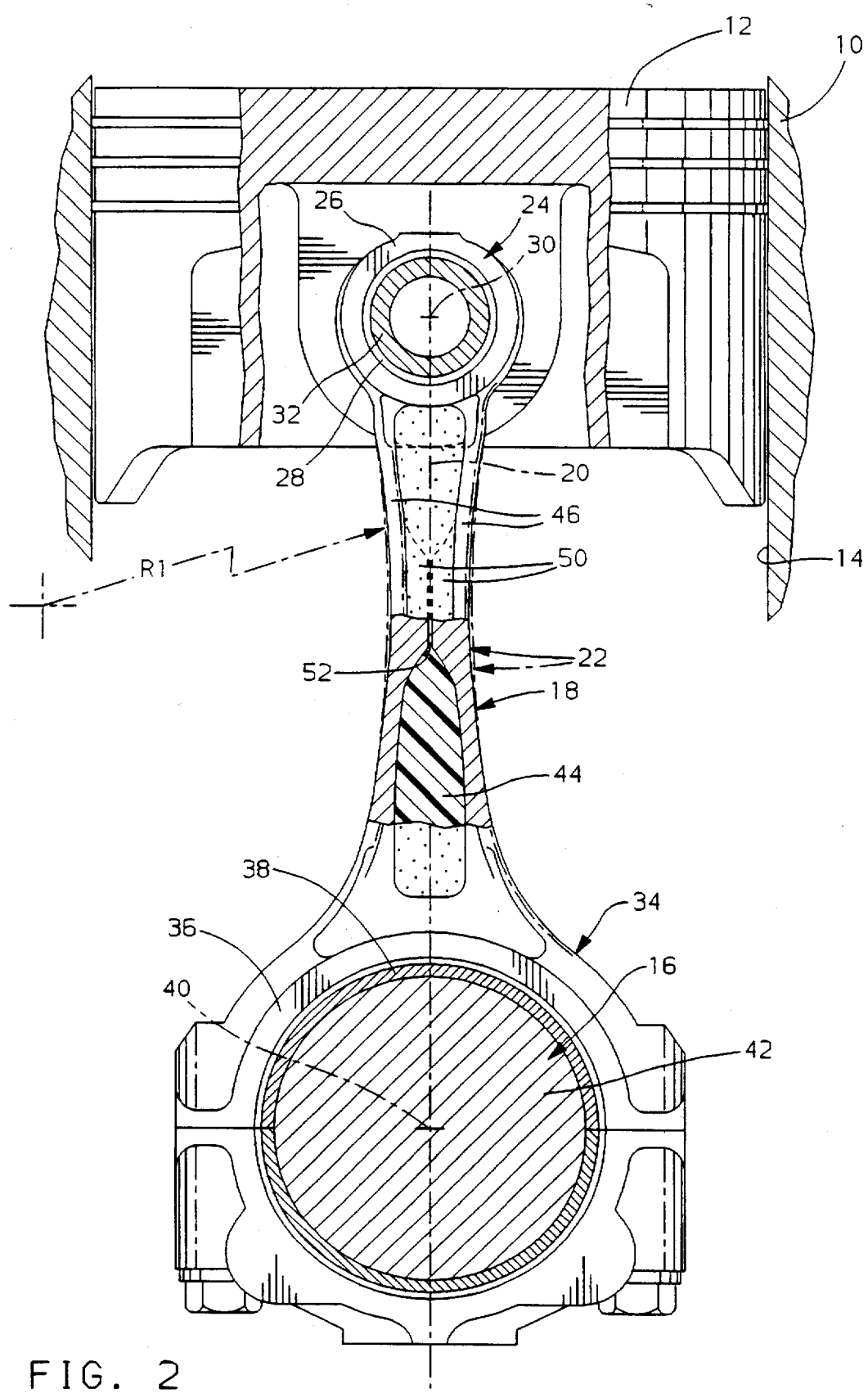
FIG. 2 is a partial, schematic view of the internal combustion engine of FIG. 1 showing the connecting rod under compression loading.
Figure 3:
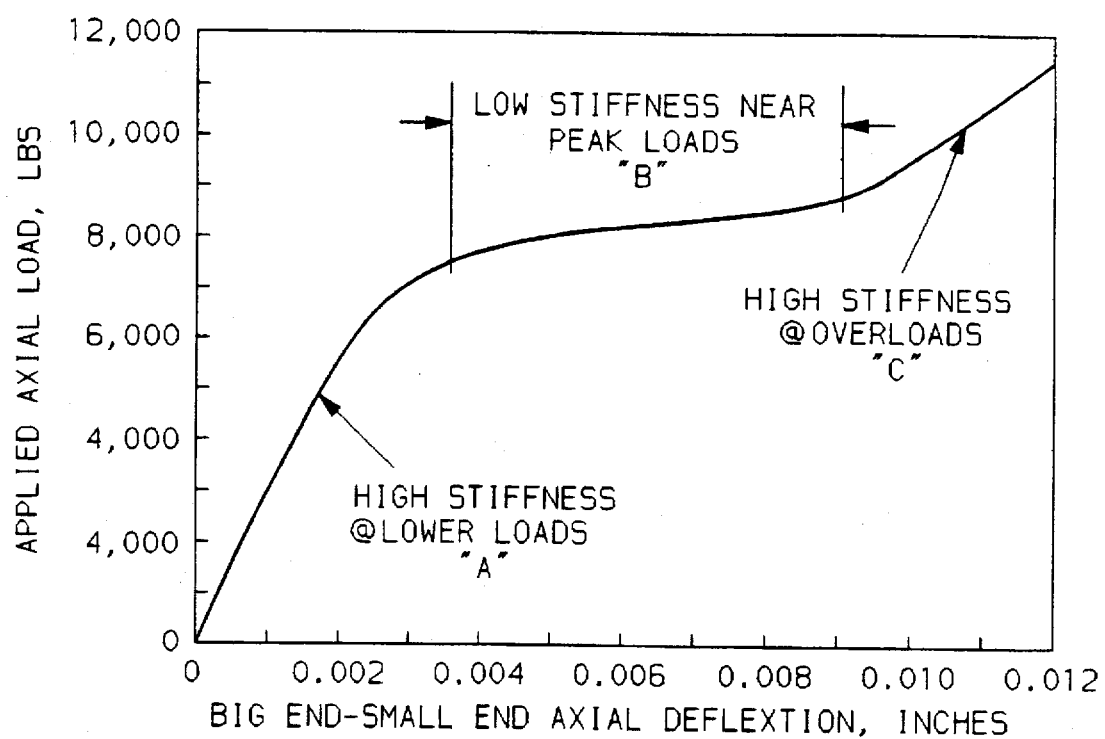
FIG. 3 is a representation of non-linear, load-deflection characteristics which may be achieved through the application of the present invention.

Referring to FIG. 1, an internal combustion engine 10 includes a piston 12 disposed for reciprocal movement in a cylinder 14. The piston 12 is mechanically connected to a crankshaft 16 through a connecting rod, designated generally as 18. The connecting rod 18 is preferably constructed of forged, cast or powdered metal which, for the purposes of this description, is referred to as the primary material of construction. Such primary material will exhibit predetermined strength, flexibility and durability properties which are characteristic of materials used in the construction of connecting rods for internal combustion engines and which are capable of adequately withstanding and transferring the forces generated during operation of the engine 10. The connecting rod 18 has a central longitudinal axis 20 defined by beam 22. At a first, longitudinal end 24, the connecting rod 18 has a piston pin bearing boss 26 with a bearing 28 centered on an axis 30 for receiving a piston pin 32 and, at its opposite, second longitudinal end 34 the connecting rod 18 has a crankpin bearing boss 36 with a bearing 38 centered on an axis 40 for receiving a crankpin 42 of crankshaft 16. The beam 22 includes an opening 44 which extends from a location adjacent the piston pin bearing boss 26 to a location adjacent the crankpin bearing boss 36 to thereby define opposing webs or legs 46. Disposed with the opening 44 is a secondary material 48. The secondary material 48 is chosen to have stiffness and flexibility characteristics which differ from those of the primary material of construction chosen for the connecting rod 18. Such secondary material 48 may, in a preferred embodiment include polymeric or composite materials exhibiting requisite durability in an engine environment or, metallic materials having flexibility and stiffness properties which differ from those of the primary material of construction for the connecting rod. As a result of the connecting rod construction just described, the connection between the piston pin 32 and the crankpin 42, and thus the force transfer mechanism between these two components of the engine, is through the webs 46. Under compressive loading imposed on the connecting rod 18 during the combustion event, the opposing webs 46 introduce a component of resiliency into the mechanical linkage defined by the piston 12, connecting rod 18 and crankshaft 16 by moving inwardly, towards the longitudinal beam axis 20, as illustrated in FIG. 2. Such an inward movement of the legs 46 allows the mechanism to absorb a portion of the applied compressive load, placed on the mechanical linkage by the combustion event, thereby effectively reducing the peak amplitude of the force transferred to the crankpin 42. As the webs 46 move inwardly, towards the longitudinal axis 20, the secondary material 48 disposed between the webs 46, in the opening 44, is compressed. Compression of the secondary material 48 and, thus, inward flexation of the webs 46 is controlled by the properties of the secondary material 48. As a result, the load-deflection characteristic of the connecting rod assembly may be tailored to suit a specific application based upon the choice of secondary material 48 for disposition within the opening 44 of the connecting rod 18. An example of such load-deflection performance is illustrated in FIG. 3. In FIG. 3 relatively high stiffness is seen at lower loads, graph segment "A", under which minimal deflection of the webs 46 could be expected. As the load increases, however, the webs 46 begin to flex inwardly, towards the longitudinal axis 20, at which time the effect of the secondary material may be seen to affect the load-deflection performance of the connecting rod in a non-linear manner, graph segment "B". Under high loads, following compression of the secondary material to the limits permitted by the connecting rod configuration, high stiffness characteristics are again exhibited by the connecting rod assembly, graph segment "C". Such non-linear load-deflection properties may be effective in reducing engine transmitted noise and vibration.

The rate of flexation of the opposing beams webs 46 is also varied through inwardly directed radius $R_1$. The curvature in webs 46 imposed by radius $R_1$ operates to vary the stiffness of the beam structure and, as stiffness is dependent on the curvature, a more extreme curvature, in effect a curvature having a shorter radius $R_1$, will result in a connecting rod 18 having increased flexibility characteristics.

As the force of the combustion event diminishes through the downward movement of the piston in the engine cylinder 14, the opposing webs 46 move outwardly, away from longitudinal beam axis 20, returning to their original relative relationship and removing the compressive forces imposed on the secondary material 48. As the webs 46 and the secondary material 48 return to their unloaded state, FIG. 1, a substantial portion of the previously adsorbed compressive load stored by the connecting rod 18 is transferred to the crankpin 42 such that the total transmitted force is substantially intact, but applied over an extended period, while the peak force amplitude is modified. Such a modification in peak force amplitude may be effective to reduce generated noise.

Depending upon the secondary material chosen for disposition within the opening 44 of beam 22, it may be desirable, or necessary to include overload protection in the form of flex limiting stops 50 which extend inwardly, towards the beam axis 20, to define a minimum cross section 52 in longitudinal opening 44. As compressive force is applied to the connecting rod 18, the inward movement of the webs 46 and the compression of the secondary material 48 is limited by the closing of the stops 50 thereby preventing flexing of the webs 46 and compression of the secondary material 48 beyond desired limits.

The present invention provides an improved connecting rod for internal combustion engines requiring reduction in the noise generated by the combustion event. The preferably one piece, cast, forged or powdered metal connecting rod, includes a longitudinal opening which defines flexible legs or webs, a secondary material having flexation and stiffness characteristics which differ from those of the connecting rod material is disposed within the longitudinal opening. When acted upon by a compressive, combustion generated force, the connecting rod webs flex to absorb a portion of the force. The resulting flexation of the connecting rod webs acts to compress the secondary material disposed within the opening in the connecting rod resulting in a connecting rod assembly having specific load-deflection characteristics which is capable of reducing peak force amplitude in the noise path.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A connecting rod for an internal combustion engine constructed of a primary material, said connecting rod comprising first and second ends connected by a longitudinally extending beam defining an axis, said first end including a piston pin bearing boss for receiving a piston pin of a piston therein and said second end including a crankpin bearing boss for receiving a crankpin of a crankshaft therein and said longitudinally extending beam having an opening defining opposing webs, said opening having a secondary material disposed therein, wherein said webs and said secondary material disposed in said opening are subject to flexation, relative to said beam axis, under compressive loading of said connecting rod, to absorb and return a portion of the loading to thereby modify peak force amplitude.

2. A connecting rod for an internal combustion engine, as defined in claim 1, said secondary material having lower stiffness characteristics than said primary material.

3. A connecting rod for an internal combustion engine constructed of a primary material, said connecting rod comprising first and second ends connected by a longitudinally extending beam defining an axis, said first end including a piston pin bearing boss for receiving a piston pin of a piston therein and said second end including a crankpin bearing boss for receiving a crankpin of a crankshaft therein and said longitudinally extending beam having an opening therein defining opposing webs, said opening having a secondary material disposed therein, wherein said webs are subject to flexation towards said beam axis to compress said secondary material, under compressive loading of said connecting rod, to absorb a portion of the loading and thereby modify peak force amplitude, and flexible away from said beam axis to uncompress said secondary material, upon reduction of the compressive loading of said connecting rod.

4. A connecting rod for an internal combustion engine constructed of a primary material, said connecting rod comprising first and second ends connected by a longitudinally extending beam defining an axis, said first end including a piston pin bearing boss for receiving a piston pin of a piston therein and said second end including a crankpin bearing boss for receiving a crankpin of a crankshaft therein and said longitudinally extending beam having an opening therein, extending from said first end to said second end, to thereby define opposing webs, said opening having a secondary material disposed therein, wherein said webs are flexible towards said beam axis, under compressive loading of said connecting rod, to compress said secondary material and to absorb a portion of the load, thereby modifying peak force amplitude, and flexible away from said beam axis, upon reduction of compressive loading of said connecting rod.

5. A connecting rod for an internal combustion engine constructed of a primary material, said connecting rod comprising first and second ends connected by a longitudinally extending beam defining an axis, said first end including a piston pin bearing boss for receiving a piston pin of a piston therein, said second end including a crankpin bearing boss for receiving a crankpin of a crankshaft therein and said longitudinally extending beam having an opening therein defining opposing webs, said opening having a secondary material disposed therein, wherein said webs are flexible inwardly, towards said beam axis, under compressive loading of said connecting rod, to compress said secondary material disposed in said opening and absorb a portion of the loading and thereby modify peak force amplitude, and flexible away from said beam axis, upon reduction of the compressive loading of said connecting rod, said webs including first and second stops extending into said opening towards said axis to define a minimum opening cross section, said stops operable to limit the inward movement of said webs and the compression of said secondary material disposed in said opening under compressive loading of said connecting rod, by closing of said minimum opening cross section.

* * * * *